United States Patent
Fischer et al.

(10) Patent No.: US 6,728,371 B1
(45) Date of Patent: Apr. 27, 2004

(54) METHOD AND APPARATUS FOR STABILIZATION OF A LINE POWERED MODULATOR CIRCUIT

(75) Inventors: Jonathan Herman Fischer, Blandon, PA (US); Keith Eugene Hollenbach, Kutztown, PA (US); Donald Raymond Laturell, Allentown, PA (US); Lane A. Smith, Easton, PA (US); Weilin Zhu, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/442,544

(22) Filed: Nov. 18, 1999

(51) Int. Cl.[7] ............................. H04M 1/00; H04M 9/00
(52) U.S. Cl. ................. 379/399.01; 379/93.06
(58) Field of Search ............................ 379/387, 399.01, 379/413, 413.01, 413.02, 413.04, 400, 403, 93.05, 93.36

(56) References Cited

U.S. PATENT DOCUMENTS 6,169,762 B1 * 1/2001 Embree et al. ............. 375/220
6,275,581 B1 * 8/2001 Fischer et al. ............. 379/398

* cited by examiner

Primary Examiner—Rexford Barnie
(74) Attorney, Agent, or Firm—Synnestvedt & Lechner LLP

(57) ABSTRACT

A method and apparatus for a data access arrangement (DAA) which includes a line modulator containing capacitive elements to increase system stability. The invention provides improved stability during system startup and normal system operation. The line modulator is capable of adjusting the AC modulation and the DC termination presented to the telephone line. Capacitive elements are added to the modulator to provide enhanced system stability. The method includes drawing power from the telephone line, modulating the telephone line, sensing a level of distortion through the line modulator, feeding the sensed level of distortion to the line modulator, and using capacitive circuits to provide additional system stability.

28 Claims, 6 Drawing Sheets

METHOD AND APPARATUS FOR STABILIZATION OF A LINE POWERED MODULATOR CIRCUIT

FIELD OF THE INVENTION

This invention relates to a telephone line interface for data access arrangements (DAA). Specifically, it relates to a line powered DAA with enhanced stability.

BACKGROUND OF THE INVENTION

The telephone lines to a residence in the United States and elsewhere can have common mode voltages of over 100V, and the FCC requires the telephone lines to be isolated from any electric main powered device (such as a PC) connected to the telephone lines (through a modem for example) to prevent damage to the telephone network. 47 CFR 68.302,4 (Oct. 1, 1997 Edition). A data access arrangement (DAA) is specified by the FCC to isolate the telephone lines from electric main powered devices, such as illustrated in FIG. 4. Since a voice band modem signal is limited to the 50 to 4000 Hz band, a DAA can be constructed using a transformer which operates as a bandpass filter to isolate the electric main powered device from the telephone lines.

A smaller size and potentially lower cost solution uses active circuits to communicate with the central telephone office and various modulation techniques to couple the DAA through small capacitors to a device, such as a PC.

FIG. 5 shows a known line powered telephone line interface circuit for modulating a data signal onto a telephone line using active circuits. The circuit is disclosed and described fully in U.S. patent application Ser. No. 09/028,061 filed on Feb. 26, 1998, entitled "Low Noise Line Powered DAA With Feedback," assigned to the same assignee as the present application, and incorporated herein by reference.

The main function of the circuit is to take the incoming current $I_{LINE}$ supplied by the telephone company and modulate it with a data signal developed by processing a differential data signal source $V_D$ with a line modulator so as to place the data signal on the telephone line. The circuit uses transistor $Q_1$ as a line modulator, and contains a shunt regulator in series with the line modulator $Q_1$. A sense resistor $R_S$ is placed in series between the line modulator $Q_1$ and the shunt regulator to monitor the current through the shunt regulator.

The circuit depicted in FIG. 5 works by monitoring the current $I_S$ through sense resistor $R_S$ with a feedback loop around the amplifier A. Resistors $R_T$ and $R_B$ sense the differential voltage across $R_S$. By setting $R_T = R_B$, the current through $R_T$ and $R_B$ will accurately model the current through $R_S$. The desired signal to be modulated is introduced by a differential signal source $V_D$. The differential signal is created by adding signal $V_D/2$ to common mode voltage, $V_{CM}$, to create $V_P$, and subtracting $V_D/2$ from $V_{CM}$ to create $V_N$. This differential signal then drives the input resistors $R_{IP}$ and $R_{IN}$ to provide a differential input current signal. The generation of the differential current signal is well known in the art. The control amplifier operates to force the current through resistor $R_S$ to equal the desired signal current by regulating transistor $Q_2$ to control the base of transistor $Q_1$, which in turn regulates the current through the collector-emitter path of transistor $Q_1$ and thereby through resistor $R_S$. In this circuit, the collector current of transistor $Q_1$ is controlled by the control amplifier A.

Ideally, the current through $R_S$ would equal the current, $I_{LINE}$, introduced to the system by the telephone company.

However, this is not the case in actuality. The current from the telephone company is introduced to the system through the emitter of transistor $Q_1$ (hereinafter "$I_{E1}$"). In the circuit depicted in FIG. 5, $I_{E1}$ is equal to $I_{LINE}$, the resistances of $R_T$ and $R_B$ are a couple hundred thousand ohms, and the resistance of $R_S$ is 10–20 ohms. Because of the relatively high level of resistance of $R_{T1}$ and $R_{B1}$, the current that flows through $R_{T1}$ and $R_{B1}$ can be neglected in the circuit analysis. As current flows through the circuit, $I_{E1}$ is divided into the transistor $Q_1$ base current (hereinafter "$I_{B1}$") and the transistor $Q_1$ collector current (hereinafter "$I_{C1}$") The collector current $I_{C1}$ through the resistor $R_S$ is used by amplifier A in a feedback loop to modulate the desired signal onto $I_{LINE}$.

FIG. 6 shows another known line powered telephone line interface circuit for modulating a data signal onto a telephone line using active circuits. The circuit is disclosed and described fully in U.S. patent application Ser. No. 09/280,473 filed on Mar. 30, 1999, entitled "Method and Apparatus for Decreasing Distortion in a Line Powered Modulator Circuit," assigned to the same assignee as the present application, and is incorporated herein by reference.

As in the circuit described above in reference to FIG. 5, the main function of the circuit in FIG. 6 is to take the incoming current $I_{LINE}$ supplied by the telephone company and modulate it with a data signal developed by processing a differential data source signal $V_D$ with a line modulator so as to place the data signal on the telephone line. The circuit uses transistor $Q_1$ as a line modulator, and contains a shunt regulator in series with the line modulator $Q_1$. A first sense resistor $R_{S1}$ is placed in series between the line modulator $Q_1$ and the shunt regulator to monitor the current through the shunt regulator. In addition, a second sense resistor $R_{S2}$ is added within the modulator to pick up "stray components" of line current $I_{LINE}$ which are outside of the feedback path containing the first sense resistor $R_{S1}$, and incorporate the "stray components" into an additional feedback path around the amplifier A.

The circuit depicted in FIG. 6 works by monitoring the current through sense resistor $R_{S1}$ and $R_{S2}$ with feedback loops around the amplifier A. The method of sensing the current through $R_{S1}$ and $R_{S2}$, and for generating the differential signal current is similar to the circuit setup described in reference to FIG. 5. The control amplifier operates to force the sum of the current through resistors $R_{S1}$ and $R_{S2}$, and thereby $I_{LINE}$, to equal the desired signal current by regulating transistor $Q_2$ to control the base of transistor $Q_1$, which in turn regulates the current through the source-emitter path of transistor $Q_1$.

FIG. 7 shows another known line powered telephone line interface circuit designed in low voltage CMOS technology for modulating a data signal onto a telephone line using active circuits. The circuit is disclosed and described fully in U.S. patent application Ser. No. 09/407,444 filed on Sep. 29, 1999, entitled "Pre-Charging Line Modem Capacitors to Reduce DC Setup Time," assigned to the same assignee as the present application, and is incorporated herein by reference.

As in the circuits described above in reference to FIG. 5 and FIG. 6, the main function of the circuit in FIG. 7 is to take the incoming current, $I_{LINE}$, supplied by the telephone company and modulate it with a data signal developed by processing a differential data signal source, $V_D$, with a line modulator so as to place the data signal on the telephone line. The circuit uses transistor $Q_1$ as a line modulator, and contains a shunt regulator in series with the line modulator $Q_1$. A sense resistor $R_S$ is placed in series between the line modulator $Q_1$ and the shunt regulator to monitor the current through the shunt regulator. In addition, resistors $R_1$ and $R_2$ and capacitors $C_1$ and $C_2$ are included to set the AC gain of the modulator. Because the circuit is used to control AC and DC characteristics, additional components are required to obtain desired AC and DC values.

To have a low enough frequency response for the full voice band (e.g., down to about 50 Hz and up to about 4 kHz), capacitors $C_1$ and $C_2$ need to be large enough so there is not undue frequency response distortion of the signal. However, larger capacitors take a longer time to charge up, i.e., to finish settling down. The settling time may be as large as 400 ms, for example. During the time that the capacitors are charging, the transient charging current is added to the desired DC current level, causing a large error in the DC line current that lasts longer than a typical setup time limit, i.e., approximately 20 ms. Thus, when the line modulator is powered up, the time constant of resistor-capacitor pairs $R_1$, $C_1$ and $R_2$, $C_2$ cause DC current errors that result in a delayed DC setup time.

The circuit in FIG. 7 overcomes startup difficulties by using two precharge amplifiers $A_2$ and $A_3$ and two switches $S_1$ and $S_2$. Amplifiers $A_2$ and $A_3$ are unity gain amplifiers which are used to precharge capacitors $C_1$ and $C_2$, respectively, during startup. Precharge amplifiers $A_2$ and $A_3$ are configured as voltage followers to equalize nodes 1 and A with each other, and nodes 2 and B with each other, respectively. They are enabled and disabled in accordance with an enable signal EN. The goal is to raise node A up to the voltage at node 1 as quickly as possible, and to raise node B up to the voltage at node 2 as quickly as possible, thereby precharging capacitors $C_1$ and $C_2$. Because no DC current passes through resistors $R_1$ and $R_2$, the voltages at nodes A and B should equalize to those of nodes 1 and 2 very quickly, due to the operation of precharge amplifiers $A_2$ and $A_3$. Amplifiers $A_2$ and $A_3$ are operational when they are enabled by a high enable signal EN. A high EN signal is generated from the beginning of the power up phase to some time period which allows the capacitors to be sufficiently precharged. The precharge operation in enhanced by adding switches $S_1$ and $S_2$, which are also controlled by the EN signal so that they are open during the precharge phase. Switches $S_1$ and $S_2$ are placed in series with resistors $R_1$ and $R_2$ to eliminate them from the circuit during the precharge phase.

Although the circuits depicted in FIG. 5, FIG. 6, and FIG. 7 depict line powered DAAs capable of modulating a data signal onto a telephone line, the stability of the systems require improvement in order to create DAAs that are capable of being used for a wide variety of applications. Instability is introduced by the individual components of the line powered DAAs operating as amplifiers and voltage level shifters. Inherent to amplifiers and voltage level shifters is the potential for phase changes, especially at high frequencies. The phase changes associated with the individual components can produce oscillations in the DAA, which leads to system instability.

SUMMARY

The present invention proposes a novel method and apparatus for increasing the stability of a line powered telephone line interface or data access arrangement (DAA). The present invention accomplishes the task of increasing stability by strategically placing capacitance in the line powered telephone line interface or DAA. In a preferred embodiment, the invention enhances the normal operation of known DAAs by inserting additional capacitance into the DAA. In addition to enhanced system stability during normal operation, the present invention provides improved system stability on startup.

DETAILED DESCRIPTION OF THE INVENTION

The present invention provides a line powered data access arrangement (DAA) device having improved stability over the prior art. The present invention is particularly useful for modern telephone modems (V.90 standard).

Figure 1:
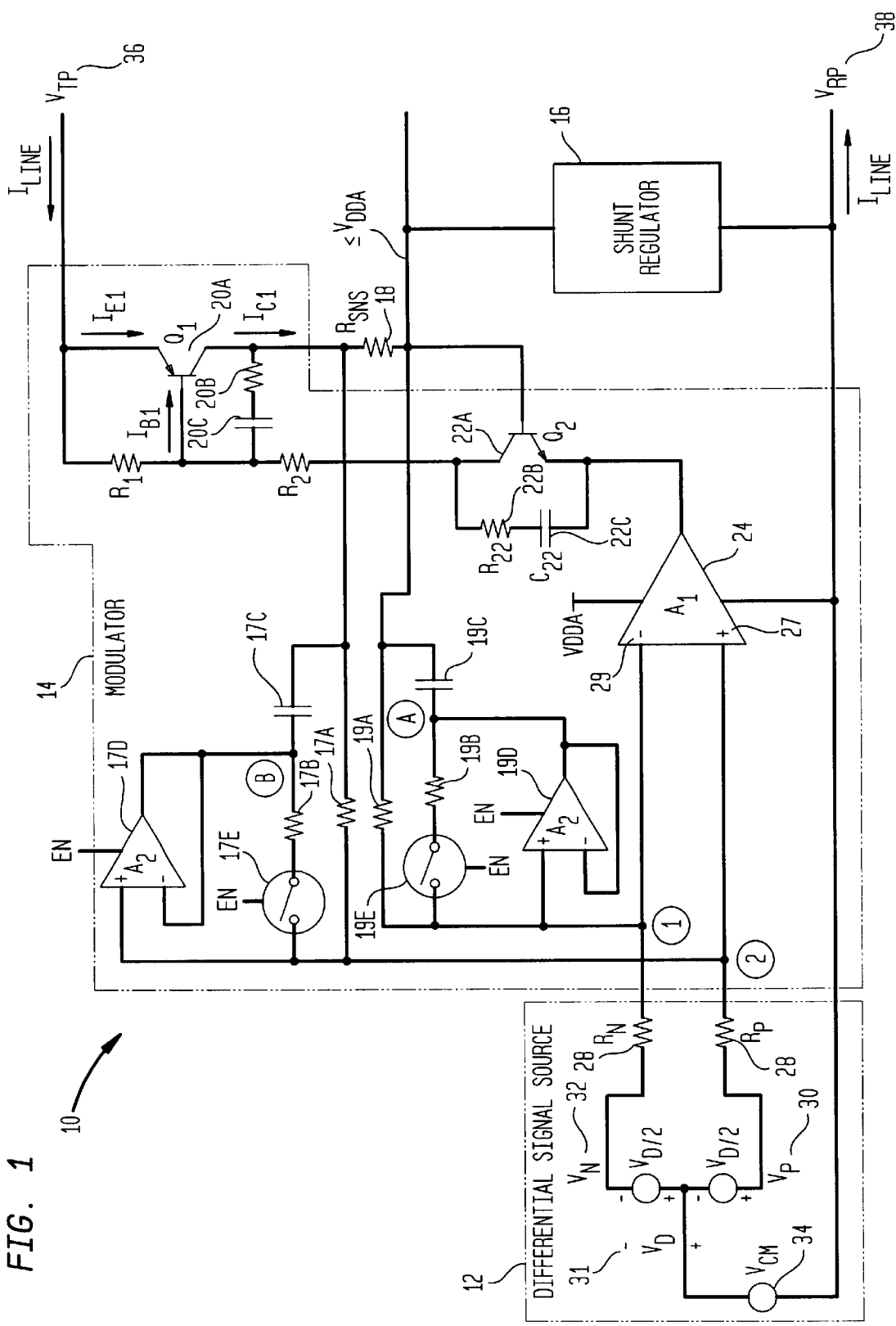
FIG. 1 is a circuit diagram of a stable, low noise, line powered DAA in accordance with the present invention.

A circuit diagram 10 of a preferred embodiment of the present invention is illustrated in FIG. 1. The differential signal source 12 functions by adding half of the desired signal voltage 31 to the common mode voltage 34 to create voltage signal 30, and subtracting half of the signal voltage 31 from common mode voltage 34 to create voltage signal 32. These differential signals 30 and 32 then drive the input resistors 26 and 28 to provide a differential signal input current into the amplifier 24 at the non-inverting input 27 and at the inverting input 29, respectively. The generation of the differential signal currents can be made by other means which are well known in the prior art, and thus will not be further discussed.

The shunt regulator 16 provides power drawn from the telephone line to the line modulator circuit 14 as well as to other modem and/or data processing circuitry necessary to provide a DC termination and AC modulation of the telephone line. The shunt regulator 16 limits the voltage across system components which are in parallel with the shunt regulator 16 to voltage level $V_{DDA}$. The shunt regulator 16 is especially important if the amplifier 24 and other circuitry is fabricated in low voltage CMOS technology that cannot withstand voltages greater than 5 volts (or other fabrication technologies with low voltage requirements). Since the voltage difference between the telephone line tip voltage 36 and the telephone line ring voltage 38 can range from 5 to over 100 volts, the DAA 10 could be destroyed in the absence of shunt regulator 16.

The sense resistor 18 is used in a feedback loop by the control amplifier 24 located within line modulator circuit 14. By monitoring the current through sense resistor 18 with a feedback loop, the amplifier 24 can compensate for distortion in the DAA 10. Resistors 17A and 19A sense the differential voltage across sense resistor 18. By setting the resistance of resistor 17A equal to the resistance of resistor 19A, the current through resistors 17A and 19A will accurately model the current through resistor 18. In a preferred embodiment, the resistance of resistors 17A and 19A is several hundred thousand ohms, while the resistance of the sense resistor 18 is approximately 10–20 ohms. Because of the relatively large resistance of resistors 17A and 19A, the current through these resistors can be neglected in the circuit analysis. Ignoring the currents through resistors 17A and 19A, the current through resistor 18 is approximately equal to the current through the shunt regulator 16, which is connected in series with sense resistor 18, and the current into other circuits connected to $V_{DDA}$. Resistor $R_1$ and resistor $R_2$ are used to bias line modulator transistor 20A in a commonly known manner.

Ideally, the feedback path to amplifier 24 will contain all of the telephone line current $I_{LINE}$ which is introduced to the DAA 10. The placement of sense resistor 18 will pick up a majority of the desired current, however, some stray current will pass outside of the feedback path containing the sense resistor 18. If more of $I_{LINE}$ is desired in a feedback path to amplifier 24, auxiliary sense resistors in auxiliary feedback paths can be placed in circuit 10 without departing from the spirit of the present invention.

Resistor 17B and capacitor 17C coupled in series across feedback path resistor 17A and resistor 19B and capacitor 19C coupled in series across feedback path resistor 19A are used to set the AC gain of DAA 10. During normal operation, amplifiers 17D and 19D are not activated and, therefor, do not affect circuit performance. Also, during normal operation, switches 17E and 19E are effectively closed allowing current to flow through resistors 17B and 19B.

During normal operation, the control amplifier 24 senses the current through sense resistors 18 with a feedback loop and attempts to control the circuit in the following manner. Resistors 17A and 19A sense the differential voltage across sense resistor 18. By setting resistor 17A equal to resistor 19A, the current through resistor 17A into the non-inverting input 27 of control amplifier 24 and the current through resistor 19A into the inverting input 29 of control amplifier 24 will accurately model the current through sense resistor 18. This sum approximately models $I_{LINE}$ and is the parameter to be controlled. The feedback action of the loop comprising sense resistor 18, amplifier 24, control transistor 22A, and line modulator transistor 20A adjusts the current through sense resistor 18 such that the current through resistor 17A equals the current from the differential signal source 12 through resistor 28, and the current through resistor 19A equals the current from the differential signal source 12 through resistor 26.

Bipolar Junction Transistors (BJT) are used to describe the operation of line modulator transistor 20A and control transistor 22A. However, other types of transistors may be used, such as Field Effect Transistors (FET). For this reason the bases of transistors 20A and 22A may also be referred to as the control terminals, and the collector-emitter pairs of transistors 20A and 22A may be referred to as the current flow terminals of transistor 20A and 22A, respectively.

In accordance with a preferred embodiment of the present invention, as depicted in FIG. 1, the output of amplifier 24 is electrically connected to the emitter of control transistor 22A, the collector of control transistor 22A is electrically connected to the base of line modulator transistor 20A, and the base of control transistor 22A is electrically connected to the collector of line modulator transistor 20A through sense resistor 18. In this configuration, the sense resistor current $I_S$ through the sense resistor 18 is equal to the line modulator transistor 20A collector current $I_{C1}$. The total line current $I_{LINE}$ consists of the transistor 20A emitter current $I_{E1}$ and the current through resistor $R_1$. The modulator transistor 20A collector current $I_{C1}$ is nearly a linear function of its base current $I_{B1}$ since the BETA of a transistor tends to be a weak function of the bias current. The feedback loop around sense resistor 18 controls $I_{C1}$ to be a low distortion copy of the input signal. The current through resistor $R_1$ changes only a small amount because of the exponential relationship between the base-emitter voltage of transistor 20A and the modulator transistor 20A collector current $I_{C1}$. The effect of the current through resistor $R_1$ is further reduced if a transistor with a high BETA is used for modulator transistor 20A so that the modulator 20A base current $I_{B1}$ will be small and a relatively small current is needed through resistor $R_1$.

In DAA 10, line modulator transistor 20A is configured to function as an amplifier. Associated with line modulator transistor 20A, configured as an amplifier, is the potential for a phase change at high frequencies. A phase change could cause DAA 10 to turn into an oscillator, resulting in instability of the DAA 10. In order to control the phase change and enhance stability, resistor 20B and capacitor 20C are added in series between the base and collector of line modulator transistor 20A. Resistor 20B and capacitor 20C form a resistance/capacitance circuit. Phase changes are most commonly associated with amplifiers operating at high frequencies. At high frequencies, capacitor 20C behaves as a short, removing a portion of the transistor 20A base current and causing the gain for high frequencies to be diminished in a controlled way, thereby controlling the phase and improving system stability.

Control transistor 22A, in DAA 10, is configured to function as a voltage level shifter. Associated with line modulator transistor 20A, configured as a voltage level shifter, is the potential for a phase change at high frequencies. As discussed above, a phase change could result in instability of the DAA 10. In order to enhance stability, resistor 22B and capacitor 22C are added in series between the emitter and collector of control transistor 22A. Resistor 22B and capacitor 22C form a resistance/capacitance circuit. At high frequencies, capacitor 22C behaves as a short, bypassing the voltage level shifter 22A for high frequencies, thereby controlling the phase and improving system stability.

Figure 2:
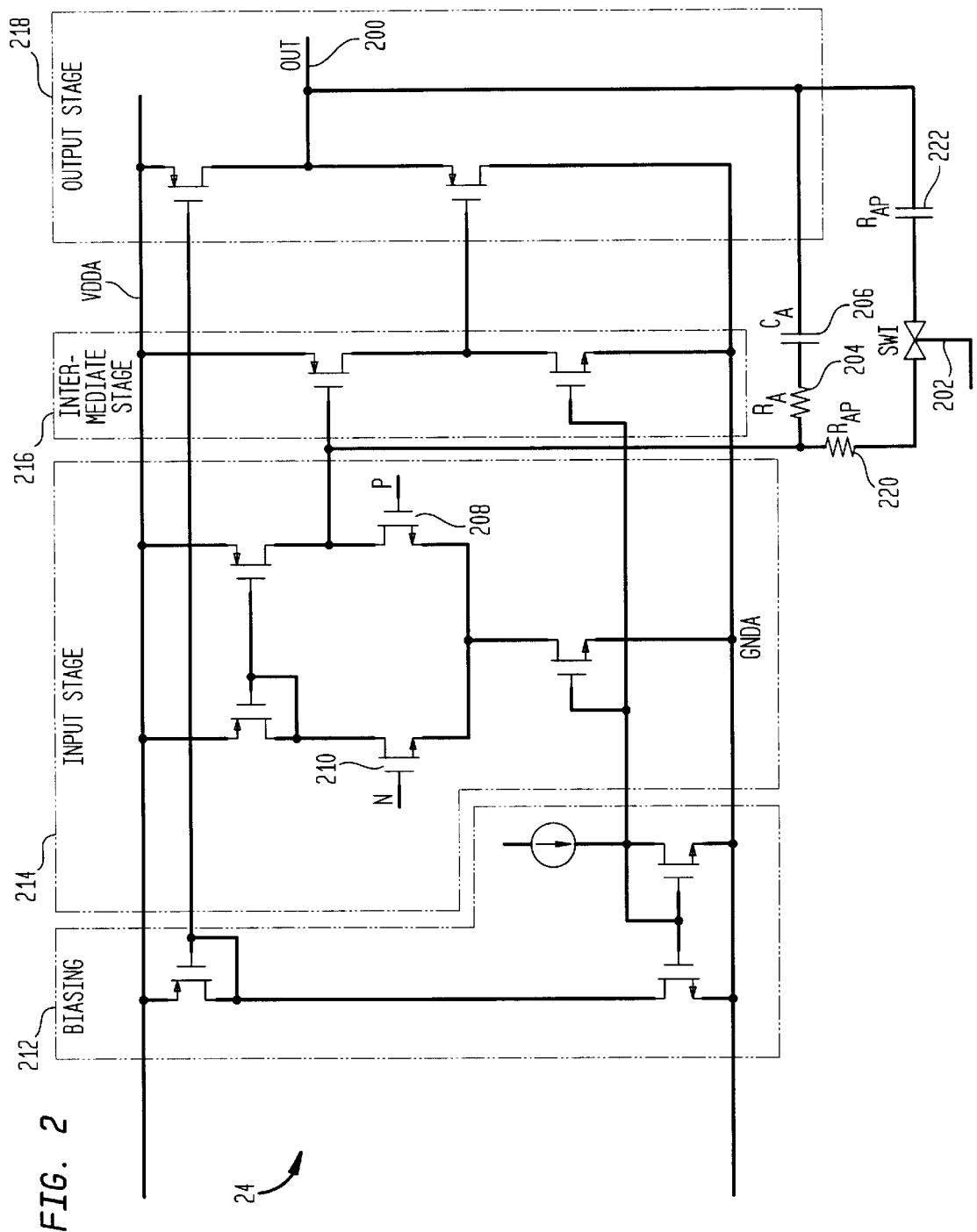
FIG. 2 is a circuit diagram of the amplifier depicted in FIG. 1 portraying additional capacitance in accordance with the present invention.

In order to further enhance stability, additional resistance and capacitance can be added to amplifier 24. FIG. 2 depicts an exploded view of amplifier 24. Except for the novel alterations discussed below, amplifier 24 is a conventional amplifier that is well known in the art. The amplifier 24 comprises a biasing portion 212, an input stage 214, an intermediate stage 216, and an output stage 218. As stated above, associated with an amplifier is the potential for a phase change at high frequencies. To increase system stability, resistor 204 and capacitor 206 are added in series between the output 200 and drain of field effect transistor (FET) 208, of amplifier 24. The gate of FET 208 is located at the non-inverting input of amplifier 24 and the drain of FET 208 is located at an input to intermediate stage 216. Resistor 204 and capacitor 206 form a resistance/capacitance circuit. At high frequencies, capacitor 206 behaves as a short, causing the gain for high frequencies to be diminished in a controlled way, thereby controlling the phase and improving system stability. Resistor 220 and capacitor 222 are system components which add additional resistance and capacitance to the DAA 10 for stability during the precharge phase. Resistor 220 and capacitor 222 form a resistance/capacitance circuit. During normal operation, switch 202 is open. Therefore, resistor 220 and capacitor 222 do not affect circuit performance during normal operation.

Referring again to FIG. 1, during system precharge, amplifiers 17D and 19D are enabled. While enabled, amplifiers 17D and 19D charge capacitors 17C and 19C, respectively. Amplifiers 17D and 19D are unity gain amplifiers which alter the system stability of DAA 10 when in use during the precharging phase of DAA 10. Amplifiers 17D and 19D are configured as voltage followers to equalize nodes 1 and A with each other and nodes 2 and B with each other, respectively. The goal is to raise node A up to the voltage of node 1 as quickly as possible, and to raise node B up to the voltage of node 2 as quickly as possible, thereby precharging capacitors 17C and 19C, respectively. In a preferred embodiment, amplifiers 17D and 19D are introduced to the circuit by applying an enable signal EN to the amplifiers 17D and 19D.

In the preferred embodiment, switches 17E and 19E are opened when enable signal EN is applied to the switches 17E and 19E. Opening switches 17E and 19E effectively removes the paths containing resistors 17B and 19B from the DAA 10 during system precharge. Removing the paths containing resistors 17B and 19B reduces the effects of the offset voltages of amplifiers 17D and 19D and the DC voltage drops in the precharge current paths. If not removed, these voltages would be effectively across resistors 17B and 19B, and would develop error currents into the summing nodes of amplifier 24.

During system precharge, additional resistance and capacitance is needed to offset instability created while amplifiers 17D and 19D are charging their respective capacitors 17C and 19C. Referring to FIG. 2, resistor 220 and capacitor 222 are added to amplifier 24 by switch 202. Switch 202 is closed during system precharge, thereby switching additional resistance and capacitance into DAA 10, and opened during normal operation when additional resistance and capacitance is no longer needed.

Figure 3:
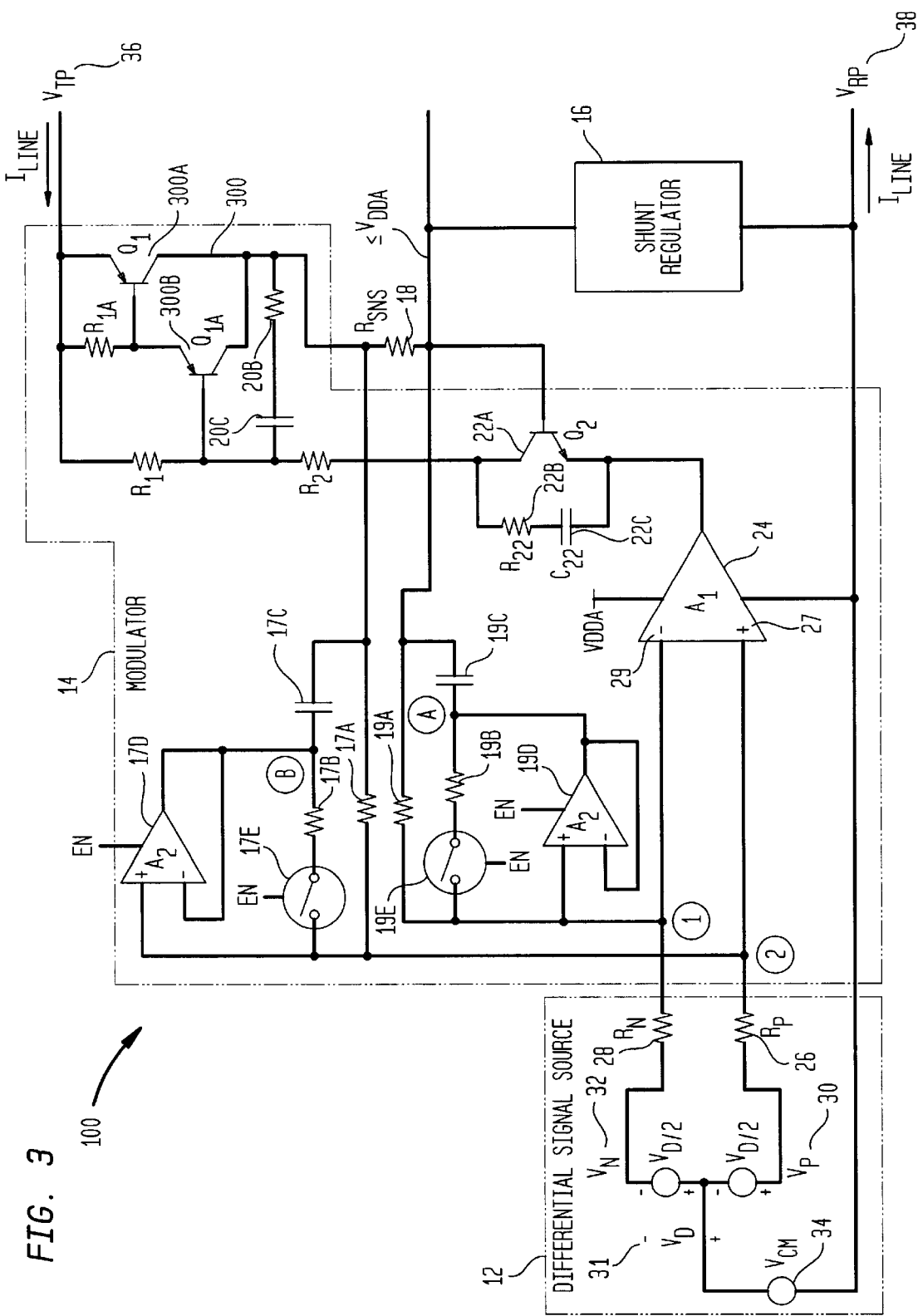
FIG. 3 is a circuit diagram of an alternative embodiment of a line powered DAA in accordance with the present invention.
Figure 4:
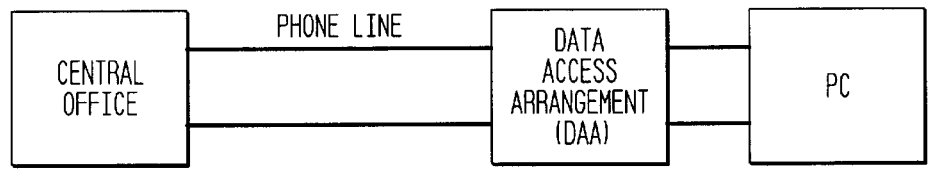
FIG. 4 is a block diagram of a conventional interface between a telephone network and an electric main powered device in accordance with the prior art.
Figure 5:
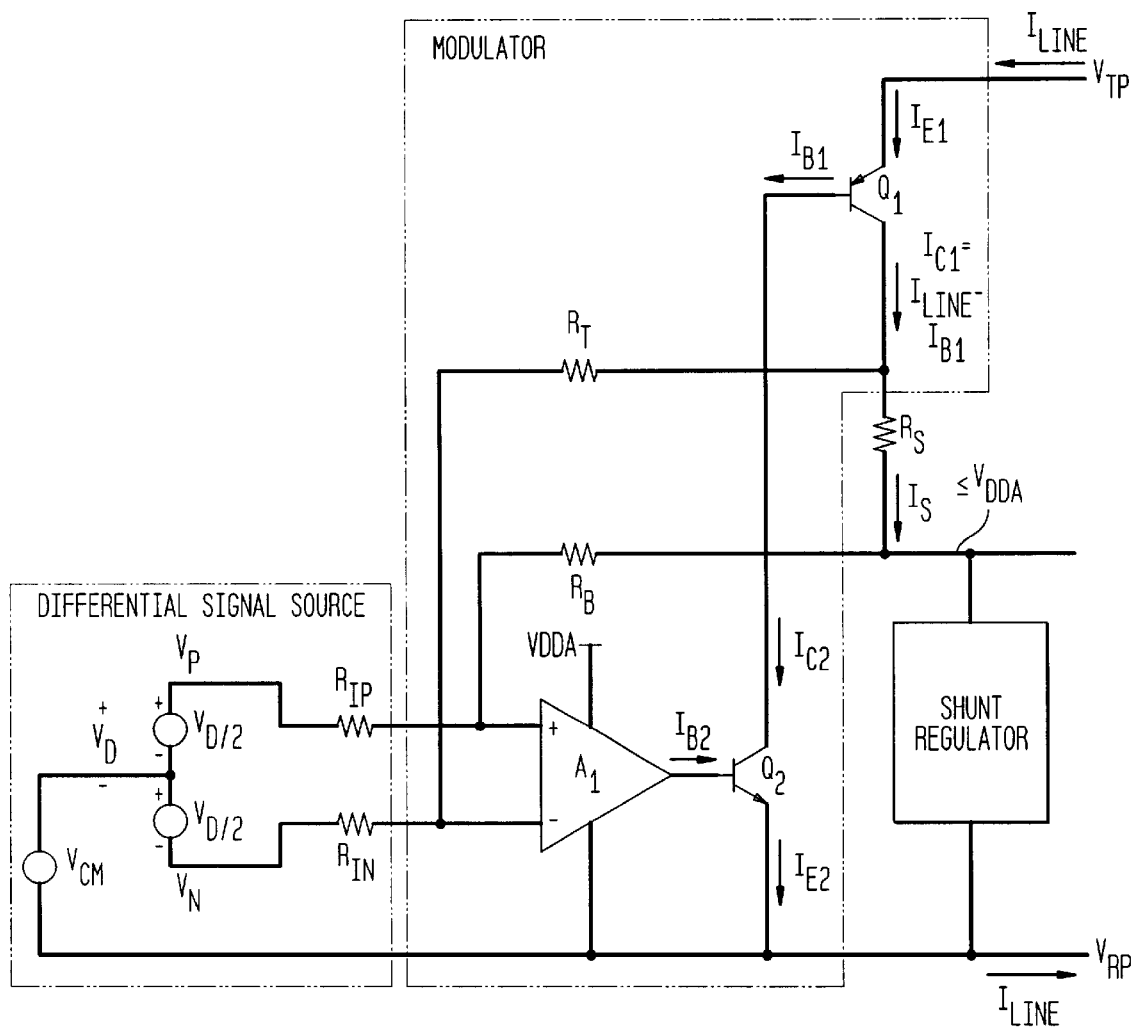
FIG. 5 is a circuit diagram of a known data access arrangement (DAA).
Figure 6:
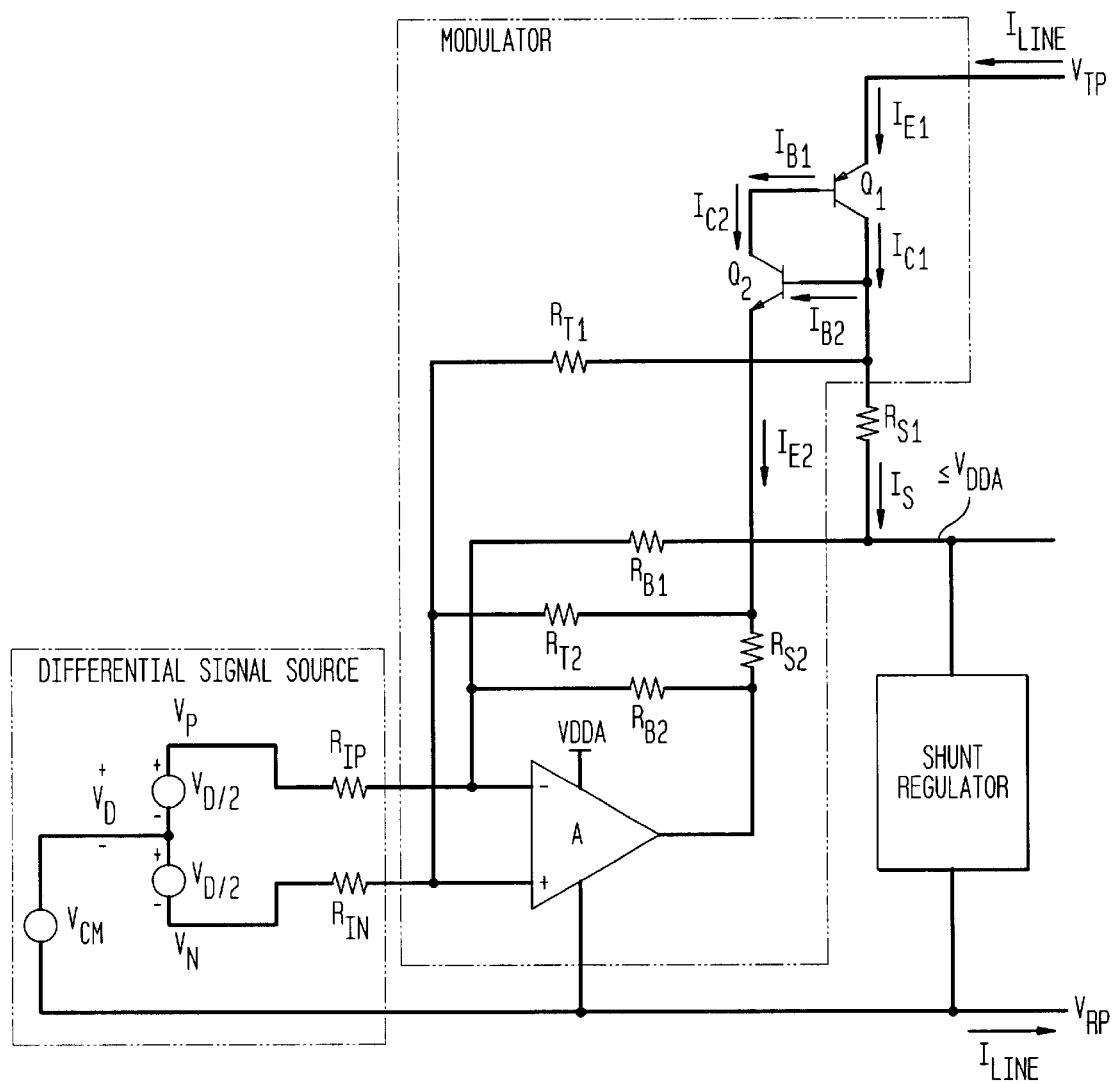
FIG. 6 is a circuit diagram of a known data access arrangement (DAA).
Figure 7:
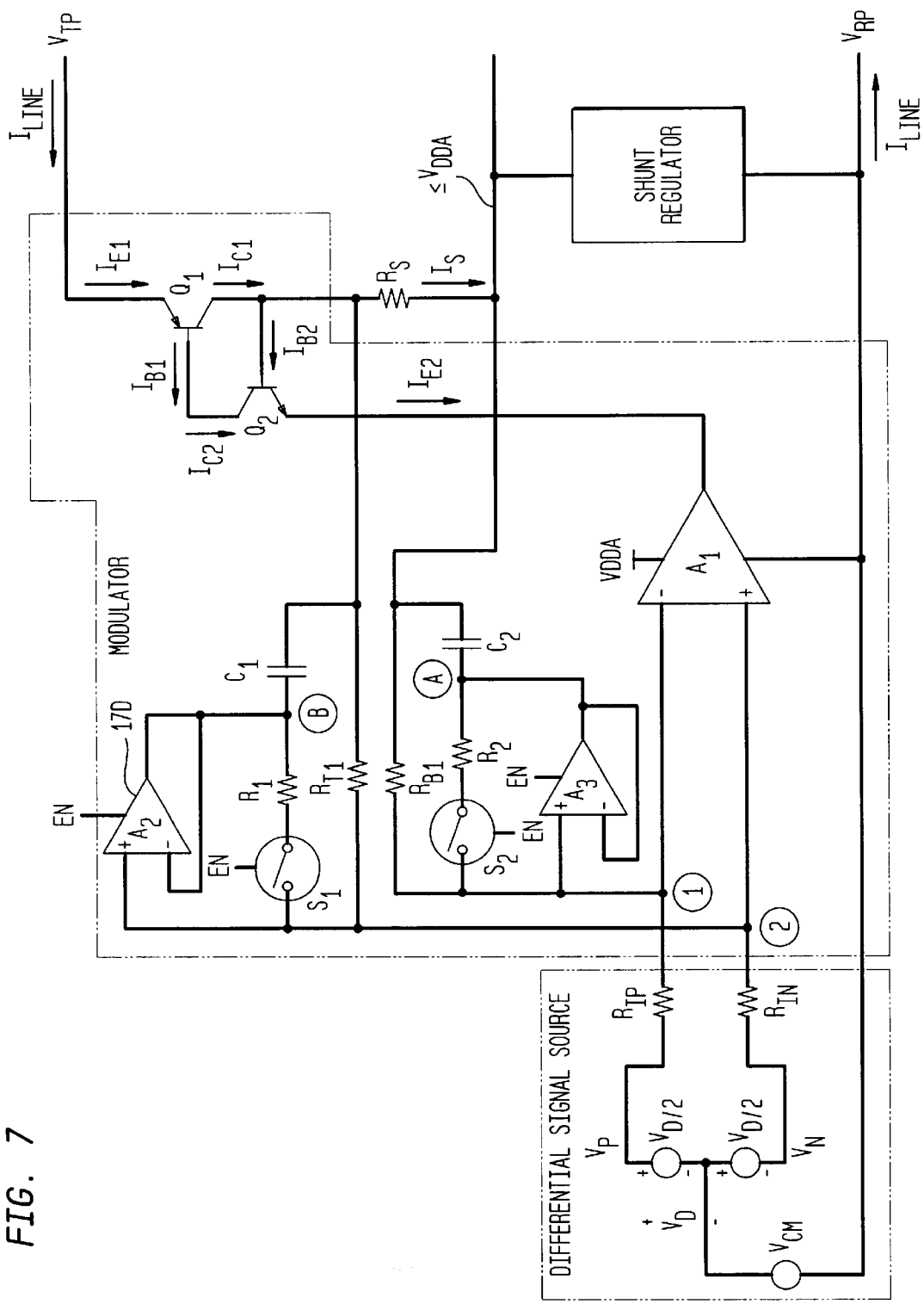
FIG. 7 is a circuit diagram of a known data access arrangement (DAA).

FIG. 3, depicts a DAA 100 with a Darlington pair 300 substituted for the line modulator transistor 20A in FIG. 1. The Darlington pair 300 comprises transistor 300A and transistor 300B. The same stabilization technique as presented above can be used with the DAA 100 containing Darlington pair 300. The Darlington pair 300 is substituted into the DAA 10 depicted in FIG. 1 by removing line modulator transistor 20A; and connecting the emitter of transistor 300A where the emitter of line modulator transistor 20A was previously positioned, connecting the base of transistor 300B where the base of line modulator transistor 20A was previously positioned, and connecting the collectors of transistors 300A and 300B where the collector of line modulator transistor 20A was previously positioned. Resistor $R_{1A}$ is added for biasing transistor 300B. The resistance and capacitance technique used for stabilization as set forth in the discussion of FIG. 1 and FIG. 2 remains the same for the use with the Darlington pair 300. The base of transistor 300B is herein termed the base (control terminal) of Darlington pair 300, and the emitter and collector of transistor 300A are herein termed the emitter and collector (current flow terminals) of Darlington pair 300.

Accordingly, the present invention provides a low noise DAA that is particularly useful for modern modems which require a high level of stability.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A telephone line interface circuit for placing an information signal on a telephone line comprising:
    a line modulator for receiving an information signal, said line modulator coupled to said telephone line for modulating said telephone line with said information signal;
    at least one resistance/capacitance circuit coupled within said line modulator for stabilizing said telephone line interface circuit;
    a sense resistor coupled to said line modulator so as to sense a current through said line modulator; and
    a feedback path from said sense resistor to said line modulator;
    such that said line modulator incorporates said current through said sense resistor and said information signal.

2. The telephone line interface circuit of claim 1 further comprising a shunt regulator coupled in series with said sense resistor on said telephone line.

3. The telephone line interface circuit of claim 2 wherein said line modulator comprises a line modulator transistor having current flow terminals coupled to said telephone line and a control terminal.

4. The telephone line interface circuit of claim 3 wherein each of said at least one resistance/capacitance circuit comprises a resistor in series with a capacitor.

5. The telephone line interface circuit of claim 4 wherein a first one of said at least one resistance/capacitance circuit is coupled to said line modulator transistor.

6. The telephone line interface circuit of claim 5 wherein said line modulator further comprises an amplifier having an output coupled to a control terminal of said line modulator transistor so as to control the current flowing through current flow terminals of said line modulator transistor, said amplifier being coupled to receive at inputs thereto said current through said sense resistor and said information signal.

7. The telephone line interface circuit of claim 6 wherein a second one of said at least one resistance/capacitance circuit is coupled to said amplifier.

8. The telephone line interface circuit of claim 7 wherein said line modulator further comprises a control transistor coupled between the output terminal of said amplifier and the control terminal of said line modulator transistor such that said current flowing through the current flow terminals of said line modulator transistor is controlled as a function of said current through said sense resistor and said information signal.

9. The telephone line interface circuit of claim 8 wherein a third one of said at least one resistance/capacitance circuit is coupled to said control transistor.

10. The telephone line interface circuit of claim 9 wherein a first of the current flow terminals of said line modulator transistor is coupled with said sense resistor and a second of the current flow terminals is coupled with said telephone line.

11. The telephone line interface circuit of claim 10 wherein a collector of said control transistor is coupled to the control terminal of said line modulator transistor, an emitter of said control transistor is coupled to the output terminal of said amplifier, and a base terminal of said control transistor is coupled to said line modulator transistor through said sense resistor.

12. The telephone line interface circuit of claim 11 wherein;
   said first one of said at least one resistance/capacitance circuit is coupled between the control terminal and said first of the current flow terminals of said line modulator transistor;
   said second one of said at least one resistance/capacitance circuit is coupled between the output of said amplifier and an interior point of said amplifier; and
   said third one of said at least one resistance/capacitance circuit is coupled between the collector and the emitter of said control transistor.

13. The telephone line interface circuit of claim 12, further comprising:
   a switch; and
   a fourth one of said at least one resistance/capacitance circuit coupled to said amplifier through said switch for stabilizing said telephone line interface circuit during a precharge phase, such that said switch operably couples said fourth one of said at least one resistance/ capacitance circuit to said amplifier during said precharge phase to provide additional resistance and capacitance to the telephone line interface circuit, and removes said fourth one of said at least one resistance/ capacitance circuit after said precharge phase.

14. The telephone line interface circuit of claim 13, wherein said fourth one of said at least one resistance/ capacitance circuit is coupled between the output and said interior point of said amplifier during said precharge phase.

15. The telephone line interface circuit of claim 12 wherein said line modulator transistor is a Darlington pair.

16. The telephone line interface circuit of claim 12 further comprising:
   one or more auxiliary sense resistors for sensing current outside of the path containing said sense resistor; and
   one or more auxiliary feedback paths corresponding to said one or more auxiliary sense resistors, said one or more auxiliary feedback paths connecting said corresponding one or more auxiliary sense resistors to said line modulator.

17. A telephone line interface circuit for placing an information signal on a telephone line comprising:
   a shunt regulator;
   a line modulator;
   a sense resistor electrically connected in series with said shunt regulator and said line modulator for sensing a current through said line modulator;
   a feedback path from said sense resistor to said line modulator; and
   at least one resistance/capacitance circuit coupled within said line modulator for stabilizing said telephone line interface circuit.

18. The telephone line interface circuit of claim 17, further comprising:
   a switch; and
   a precharge resistance/capacitance circuit coupled to said line modulator through said switch for stabilizing said telephone line interface circuit during a precharge phase, such that said switch operably couples said precharge resistance/capacitance circuit to said line modulator during said precharge phase to provide additional resistance and capacitance to the telephone line interface circuit, and removes said precharge resistance/capacitance circuit after said precharge phase.

19. The telephone line interface circuit of claim 18, wherein each of said at least one resistance/capacitance circuit comprises a resistor in series with a capacitor, and wherein said precharge resistance/capacitance circuit comprises a resistor in series with a capacitor.

20. A telephone line interface circuit for placing an information signal on a telephone line comprising:
   a sense resistor for sensing a current on said telephone line;
   a first transistor in series with said sense resistor;
   a first resistance/capacitance circuit coupled to said first transistor;
   a second transistor coupled to the base of said first transistor;
   a second resistance/capacitance circuit coupled to said second transistor;
   an amplifier having an input for accepting an information signal and an output electrically connected to said second transistor for modulating said telephone line with said information signal;
   a third resistance/capacitance circuit coupled to said amplifier; and
   a feedback path from said sense resistor to said amplifier.

21. The telephone line interface circuit according to claim 20, wherein each of said first, second, and third resistance/ capacitance circuits comprises a resistor in series with a capacitor.

22. The telephone line interface circuit according to claim 21, wherein;
   said first transistor is a pnp bipolar transistor; and
   said second transistor is a npn bipolar transistor.

23. The telephone line interface circuit according to claim 22, wherein;
   said first resistance/capacitance circuit is connected between the base and the collector of said first transistor;
   said second resistance/capacitance circuit is connected between the collector and the emitter of said second transistor; and
   said third resistance/capacitance circuit is connected between the output of said amplifier and an interior point of said amplifier.

24. The telephone line interface circuit according to claim 23, wherein;
   said amplifier controls the emitter of said second transistor; and
   said second transistor controls the base of said first transistor through the collector of said second transistor, such that said amplifier controls said first transistor.

25. The telephone line interface circuit according to claim 24, further comprising
   a switch; and
   a fourth resistance/capacitance circuit coupled to said amplifier through said switch for stabilizing said telephone line interface circuit during a precharge phase, such that said switch operably couples said fourth resistance/capacitance circuit to said line modulator during said precharge phase to provide additional resistance and capacitance to the telephone line interface circuit, and removed said fourth resistance/capacitance circuit after said prechage phase.

26. The telephone line interface circuit according to claim 25, wherein said fourth resistance/capacitance circuit comprises a resistor in series with a capacitor.

27. A telephone line interface circuit for placing an information signal on a telephone line, comprising:

means for drawing power from a telephone line;

means for modulating said telephone line with an information signal, said means for modulating being in series with said means for drawing power;

means for sensing an amount of distortion in said telephone line interface circuit, said means for sensing being connected in series with said means for drawing power and said means for modulating;

means for feeding back said sensed amount of distortion to said telephone line interface circuit; and means for stabilizing said telephone line interface circuit.

28. The telephone line interface circuit of claim 27, wherein said means for stabilizing said telephone line interface circuit comprises means for stabilizing said telephone line interface circuit during normal operation and means for stabilizing said telephone line interface circuit during a precharge phase.

* * * * *